US009264436B2

(12) United States Patent
Canning et al.

(10) Patent No.: US 9,264,436 B2
(45) Date of Patent: Feb. 16, 2016

(54) POLICY-BASED AUTOMATED CONSENT (71) Applicant: International Business Machines Corporation, Armonk, NY (US)

(72) Inventors: Simon Gilbert Canning, Upper Coomera (AU); Shane Bradley Weeden, Paradise Point (AU); Codur Sreedhar Pranam, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 13/889,707

(22) Filed: May 8, 2013

(65) Prior Publication Data
US 2014/0337914 A1 Nov. 13, 2014

(51) Int. Cl.
H04L 29/06 (2006.01)

(52) U.S. Cl.
CPC .............. *H04L 63/10* (2013.01); *H04L 63/20* (2013.01); *H04L 63/0807* (2013.01); *H04L 63/0853* (2013.01); *H04L 63/102* (2013.01)

(58) Field of Classification Search
CPC ..... H04L 63/10; H04L 63/20; H04L 63/0853; H04L 63/0807
USPC ........................................................... 726/1
See application file for complete search history.

(56) References Cited

U.S. PATENT DOCUMENTS

| 7,424,609 | B2* | 9/2008 | Kwan | 713/161 |
|---|---|---|---|---|
| 2004/0003072 | A1* | 1/2004 | Mathew et al. | 709/223 |
| 2006/0095956 | A1 | 5/2006 | Ashley et al. | |
| 2007/0038765 | A1* | 2/2007 | Dunn | 709/229 |
| 2009/0254978 | A1 | 10/2009 | Rouskov et al. | |
| 2009/0300509 | A1 | 12/2009 | Mathew et al. | |
| 2010/0037304 | A1* | 2/2010 | Canning et al. | 726/7 |
| 2012/0254957 | A1* | 10/2012 | Fork | G06F 21/33 726/6 |
| 2013/0217333 | A1* | 8/2013 | Sprigg | H04W 4/008 455/41.2 |
| 2013/0227675 | A1* | 8/2013 | Fujioka | G06F 21/30 726/16 |
| 2014/0041055 | A1* | 2/2014 | Shaffer | G06Q 10/10 726/28 |
| 2014/0100028 | A1* | 4/2014 | Jalili | G06Q 30/02 463/31 |
| 2014/0133656 | A1* | 5/2014 | Wurster | H04L 9/0637 380/270 |
| 2014/0298486 | A1* | 10/2014 | Robertson | G06F 21/6218 726/28 |
| 2015/0200948 | A1* | 7/2015 | Cairns | G06F 21/44 726/4 |

OTHER PUBLICATIONS

Adam et. at., "A content-based authorization model for digital libraries", 2002, IEEE,vol. 14 Issue:2,pp. 296-315.*
Lodderstedt et al, "OAuth 2.0 Threat Model and Security Considerations," IETF RFC 6819, Jan. 2013.
The Essential OAuth Primer: Understanding OAuth for Securing Cloud APIs, Ping Identity Corporation white paper, http://www.innovation-district.com/wp-content/uploads/2012/04/The-Essentials-of-OAuth.pdf, published 2011.
"OAuth 2.0 Developer Center," http://msdn.microsoft.com/en-us/library/live/hh243647.aspx, Apr. 2013.

* cited by examiner

*Primary Examiner* — Hadi Armouche
*Assistant Examiner* — Ali Shayanfar
(74) *Attorney, Agent, or Firm* — William Stock; David H. Judson (57) ABSTRACT

A technique for intelligent automated consent is described by which a client may be automatically authorized to access a resource owner's protected information (e.g., a profile) based on the owner's previous authorization decisions and/or other client classifications. Using this approach to granting consent, the resource owner is not required to intervene during the authorization step for each client that is requesting access. Clients may be categorized, and authorization given to individual clients based on the category to which they belong and/or the scope of the access request. The technique may be implemented with user-centric identity protocols, as well as with delegated authorization protocols. The technique provides for policy-based consent grants.

14 Claims, 5 Drawing Sheets

POLICY-BASED AUTOMATED CONSENT

BACKGROUND OF THE INVENTION

1. Technical Field

This disclosure relates generally to identity management in a networking environment.

2. Background of the Related Art

User-centric identity protocols, such as OpenID, and delegated authorization protocols, such as OAuth 2.0, require users to authorize consent for clients (e.g., web sites) that wish to access the user's profile information. This authorization typically is achieved via a web form prompt to the user at an identity provider or other authorization server. The form contains information identifying the client, the type of data, one or more operations, or other context information, that can be used by the end user to make a consent decision. By completing the form or otherwise providing the consent, the user can then allow subsequent (and automated) access by the client to the user's profile information. In current implementations, however, users must authorize every client, as there is no known technique for giving automatic consents to certain clients that, for example, have some commonality with other clients. As such, the authorization requirement is onerous on the user when accessing sites of a similar nature, particularly where consent decisions are not persisted to long term storage.

User-Managed Access (UMA) is a draft protocol that defines how resource owners can control protected-resource access by clients operated by arbitrary requesting parties, where the resources reside on any number of resource servers, and where a centralized authorization server governs access based on resource owner policy. The solution delegates the authorization decision to another system that, in turn, has to validate each client request. The UMA protocol, however, does not define any mechanisms by which policy decisions are authored by the resource owner or made by the access manager.

BRIEF SUMMARY

According to this disclosure, a technique for intelligent automated consent is described by which a client may be automatically authorized to access a resource owner's protected information (e.g., a profile) based on the owner's previous authorization decisions and/or other client classifications. Using this approach to granting consent, the resource owner is no longer required to intervene during the authorization step for each client that is requesting access. Clients may be categorized, and authorization given to individual clients based on the category to which they belong and/or the scope of the access request. The technique may be implemented with user-centric identity protocols, as well as with delegated authorization protocols. The technique provides for policy-based consent grants.

According to one embodiment, a method of managing granting of consent to access a protected resource is described. The protected resource is associated with a resource owner. The method begins upon receipt of a request to access a protected resource, the request having a scope and being associated with a client. Upon receipt, an analysis is performed (typically of a request URI) to identify a characteristic of the client. Based on the characteristic of the client and the scope of the request, a policy is applied to determine whether the client should receive an automated consent to access the protected resource. If, based on the policy, the client should receive an automated consent, given information is then returned to the client. In one embodiment, the given information is an OAuth token that the client can then use to obtain access to the protected resource without requiring an explicit consent from the resource owner.

There may be many ways to determine the client characteristic. Preferably, one or more information services may be consulted. The information services include, for example, a URL categorizer, a domain tag service, a URL reputation engine, a privacy policy service, and the like. If the policy cannot be met, a prompt is issued to the resource owner in order to obtain an explicit consent to access. Upon receipt of the consent, the policy may be updated and applied against future requests.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
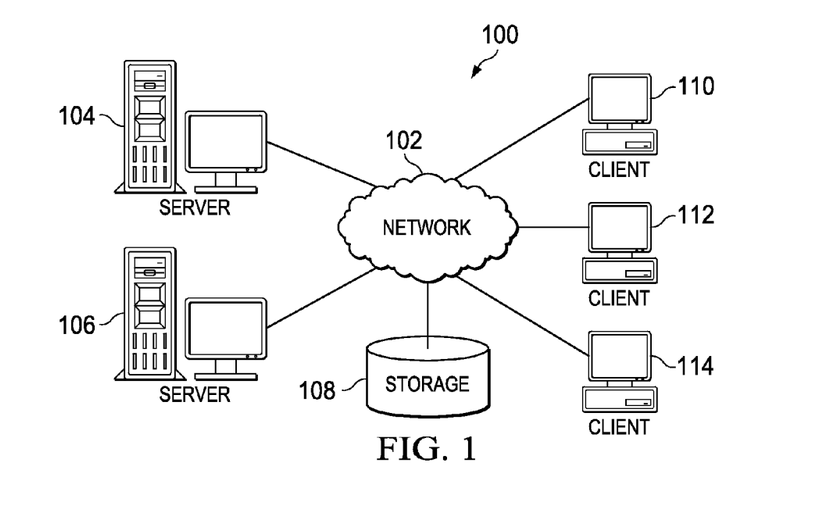
FIG. 1 depicts an exemplary block diagram of a distributed data processing environment in which exemplary aspects of the illustrative embodiments may be implemented.
Figure 2:
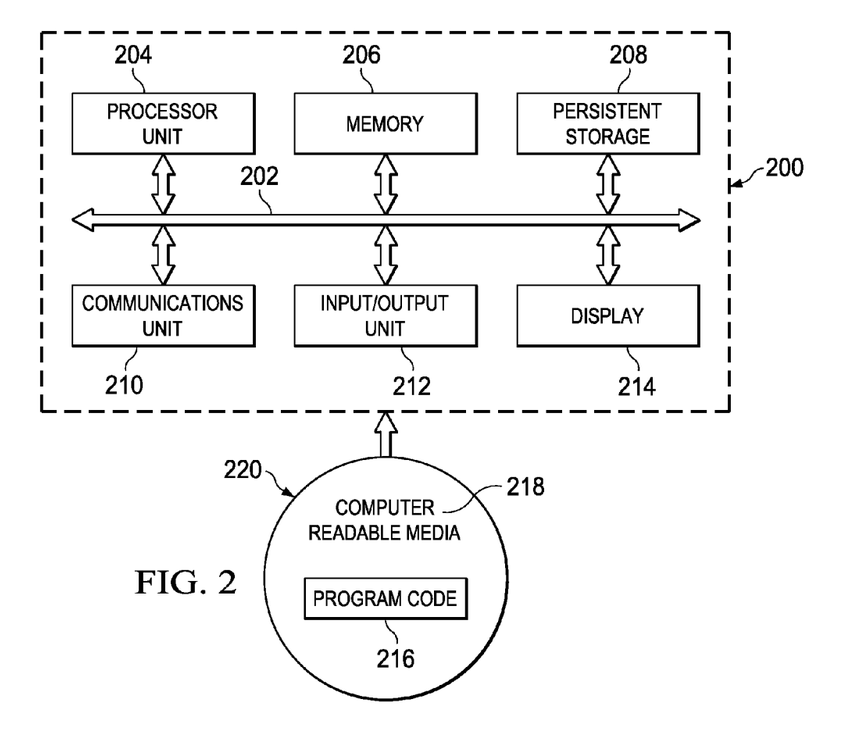
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data.

Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, Objective-C, C++ or the like, and conventional procedural programming languages, such as the "C" programming language or similar programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Single sign-on (SSO) is an access control mechanism which enables a user to authenticate once (e.g., by providing a user name and password) and gain access to software resources across multiple systems. Typically, an SSO system enables user access to resources within an enterprise or an organization. Federated single sign-on (F-SSO) extends the concept of single sign-on across multiple enterprises, thus establishing partnerships among different organizations and enterprises. F-SSO systems typically include protocols, such as SAML, that allow one enterprise (e.g., an identity provider) to supply a user's identity and other attributes to another enterprise (e.g., a service provider). An F-SSO system helps transport the user's credentials from the identity provider to the service provider in a trusted manner using a suitable protocol, typically HTTP. In a typical F-SSO implementation, the identity provider and the service provider have an F-SSO system that includes logic to authenticate a user, establish the user's credentials, and generate an encrypted security token (e.g., a cookie) including user information. Additionally, the service provider can also include one or more target applications. The target applications can reside within the same web environment or be a part of different web environments within the same service provider.

In a traditional client-server authentication model, a client uses its credentials to access resources hosted by a server. With the increasing use of distributed web services and cloud computing, third-party applications often require access to these server-hosted resources. OAuth is an open protocol (Internet Request for Comment (RFC) 5849) that enables users to share their private data among different Web sites along with their credentials while only exposing the data on the original Web site where it is held. In particular, the OAuth protocol allows users to share private resources stored on one Web site with other sites without exposing the users' credentials—for example, usernames and passwords—to Web sites other than the one holding the users' data. A Web site adopting OAuth as one of its authentication protocols enhances the privacy and security for users. To accomplish this functionality, OAuth introduces a third role to the traditional client-server authentication model: namely, a resource owner. In the OAuth model, the client (which is not the resource owner, but is acting on its behalf) requests access to resources controlled by the resource owner but hosted by the server. In addition, OAuth allows the server to verify not only the resource owner authorization, but also the identity of the client making the request.

As additional background, the applications that may be the target of the above-described protocols may be located in a same or different web environment, with different authentication mechanisms and different requirements. Without limitation, a target application may be located within an enterprise, or it may be located within a cloud-based operating environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. The cloud computing infrastructure typically comprises a set of functional abstraction layers including hardware/software layer, a virtualization layer, a management layer, and a workload layer. The virtualization layer provides an abstraction layer from which the following examples of virtual entities may be provided: virtual servers; virtual storage; virtual networks, including virtual private networks; virtual applications and operating systems; and virtual clients. The management layer provides dynamic procurement of computing resources and other resources that are utilized to perform tasks within the cloud computing environment. The workloads layer provides the functionality for which the cloud computing environment may be utilized. Typically, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli® Federated Identity Manager (TFIM) that is available from IBM® Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application that is being made available for access via the cloud. One or more databases are used to store directory, log, and other working data. All of these components (included the front end identity manager) are located "within" the cloud, but this is not a requirement.

Policy-Based Automated Consent

With the above as background, the policy-based automated consent technique of this disclosure is now described. As will be described, in this approach a client (requesting access to an owner's protected resource) may be granted consent for such access automatically based on one or more criteria, such as previous authorization decisions that have been made by the resource owner and/or one or more classifications associated with the client. As will be seen, the approach enables automatic consent (or "auto-consent") for future client access requests without requiring resource owner intervention.

Figure 3:
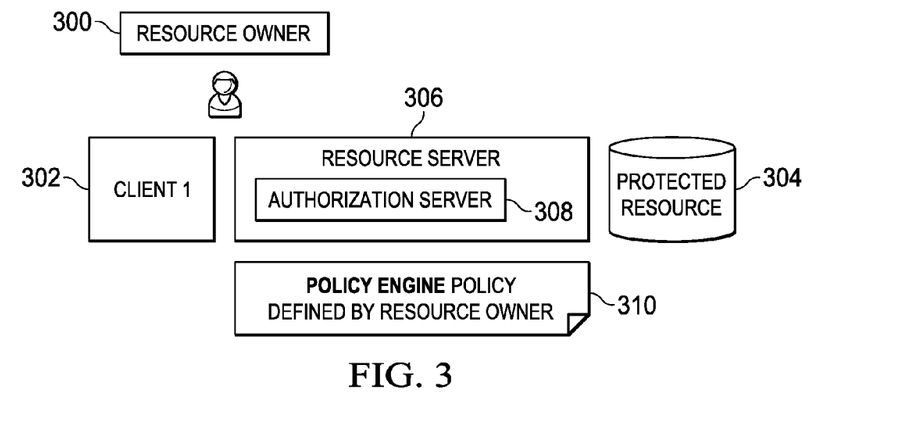
FIG. 3 illustrates a representative system for policy-based automated consent decisions according to this disclosure.

As illustrated in FIG. 3, in the basic OAuth paradigm (which is representative), a resource owner 300 is an actor (typically human) that desires to control access by a client 302 to particular protected resources 304 available at and protected by a resource server 306. The resource server 306 is an entity that protects the owner's protected resources by making those resources available only to clients that have been properly authenticated and authorized. The client is an actor (typically a web site) that desires access to the protected resource at the resource server 306. An authorization server 308 (e.g., an identity provider) is an entity that issues access tokens (in OAuth). An access token is a data object by which a client authenticates to the resource server 306 and asserts its authorization to access particular resources. Other similar protocols use other types of data objects for this purpose. An access token typically is limited in authorization scope and duration. The resource server 306 and the authorization server 308 may be the same or different servers, and they may be co-located or remote from one another. In known techniques, the resource owner may authorize consent for clients to access the owner's protected resources. As will be described, a goal of the technique described herein is to automate the process of authorizing consent (when possible) such that the resource owner need not be necessarily contacted on each occasion when a particular client desires to obtain it.

According to this disclosure, and to this end, an additional computational element is included in the system. As illustrated in FIG. 3, the system also includes a "policy engine" 310. The policy engine 310 is a computing entity (or set of computing entities) by which the resource owner may define one or more policies that should be applied when a client requests the protected resources. Typically, the policy engine (sometimes referred to herein as an "engine") is implemented at the authorization server, e.g. as a computer software program or process stored in computer memory and executed by one or more hardware elements. A policy may be defined pro-actively (i.e., in advance) by a resource owner and then applied to one or more clients. In the typical use case, however, and as will be described, a policy is defined dynamically and, in particular, at the time that the resource owner first grants a particular consent to a particular client. In this dynamic approach, when the resource owner is first contacted to authorize consent to be granted to a first client (requesting access to the protected resource), the owner is afforded an opportunity to indicate whether this particular decision should be used subsequently in determining whether other clients might be automatically authorized. If the resource owner then indicates his or her decision to use the current consent grant in the future, a policy to that effect is automatically generated based on one or more inputs received from the resource owner and, optionally, other client classification information services or sources. These information services include, for example, a content categorization service (e.g., IBM X-Force URL categorization database) that categorizes URLs according to different content types, a domain tagging service that associates one or more "tags" to a particular class or type of web sites (e.g., a "sports" tag), a reputation service that can be queried to vouch for the authenticity of a URI, a privacy policy service that can be queried to determine whether a client request satisfies certain privacy or other security criteria, a client relationship service that can be queried to determine a nature of any relationship between a first client and a second client, and the like, and combinations thereof. Once a policy is defined, one or more future clients (also seeking access to the protected resource) then obtain the benefit (of the at least one prior consent), namely, by potentially obtaining automatic authorization to access to resource owner's protected resource based on application of the policy at the engine.

As will be described, preferably a particular policy (sometimes referred to herein as an "authorization policy"), once created, may vary dynamically, based on the resource owner's interactive consent habits or other factors.

The techniques herein are now described by way of example. A typical use case is as follows. In particular, assume that a resource owner has authorized (i.e. given consent) to a first client, such as the web site espn.com (a sports site), to access one or more protected resources (e.g., the owner's email address, name, address, etc.) from an authorization server (e.g., a third party social network account such as Facebook®). At the time of granting authorization, preferably interactively, and according to this disclosure, the resource owner is afforded an opportunity to approve access, for example, to 'sites of similar categorization' (such as "all sports sites"), or any other client categorization or classification to which the espn.com client is determined to be part. Preferably, and as described in more detail below, the policy engine and/or the authorization server is responsible for performing the categorization of the client. Later, a second client, such as the site fifa.com, seeks to access the resource owner's protected resource (e.g., his or her email address) from the owner's social network account. When the client redirects the owner's web browser to an authorization consent page, the authorization server performs an analysis, for example, on the client "type." Based on that analysis, consent is automatically given, e.g., because the second client fifa.com (like espn.com) also is a sport site and the resource owner previously authorized the first access to access the owner's (otherwise) protected resource. As can be seen in this simple example scenario, the clients are both categorized as sports sites, and the solution allows the resource owner to give automatic consent to clients that, for example, are sports sites, without having to manually authorize all such similar clients. In this example, only the first client needs to be explicitly authorized by the resource owner, while subsequent clients receive automatic authorization if, for example, they belong to the same category and are making a request of the same (or perhaps lesser) scope as that which was the subject of the prior consent.

Using this approach, the resource owner has significant and fine-grained control over protected resource accesses by clients. Thus, for example, the approach allows the resource owner to choose to only allow access to protected resources information (of potentially high value) to highly trusted and reputable sites, such as a banking web site client. As noted above, the way the clients get automatic authorization to access to resource owner's protected resource preferably is based on an engine at the authorization server where the resource owner can help define policy. As noted, this authorization policy is learnt incrementally based on the user's interactive consent habits.

Figure 4:
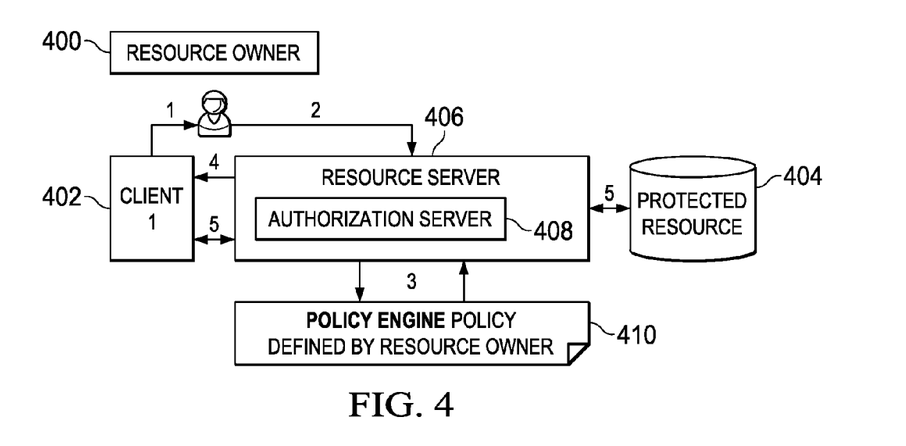
FIG. 4 depicts a representative first use case involving a first client web site.

As seen in FIG. 4, there is a resource owner 400, a client 402 seeking access to a protected resource 404 at a resource server 406, an authorization server 408 that implements a protocol such as OAuth, and the policy engine 410. The use of OAuth is merely descriptive, as the techniques here work with other similar protocols, such as OpenID. In this example, it is assumed that the authorization/resource server is a social network site. As step (1), the client 402 (e.g., espn.com) wants to access the resource owner's protected resource (e.g., name and email address). At step (2), the resource owner is redirected to the social network site and asked to authorize the client. At step (3), a query is made to the policy engine to determine whether consent has been previously given. In this example, it is assumed that no such consent exists. At step (3), the policy engine also performs a client categorization, e.g., by performing a redirect URL analysis, by querying one or more of the information sources described above, or the like. Once categorization has been completed, the authorization server determines whether authorization to access the protected resource requires the owner's consent. In this scenario, and because no prior consent has been given for this client, at step (4), the client is prompted for consent. In addition, at this time the resource owner may provide an indication that the current consent can be used in determining whether other clients may be authorized automatically. This consent (and the indication that the consent may be used to determine whether other clients may be later authorized) is received by the authorization server at step (5). In response, the authorization server returns to the client a token (when OAuth is used). This token typically is provided in an HTTP redirect, which then returns the client to the resource server and enables access to the protected resource as shown.

Figure 5:
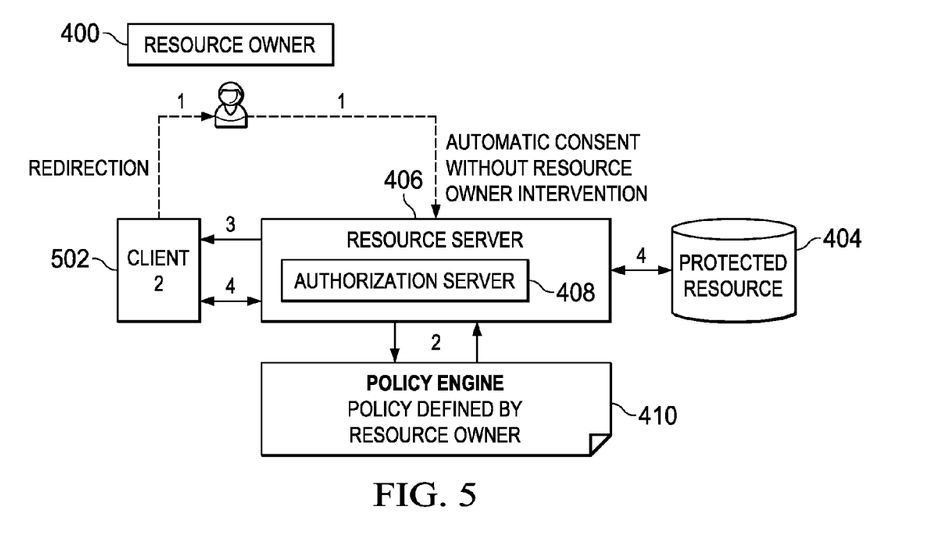
FIG. 5 depicts a representative second use case involving a second client web site.

Now, and with reference to FIG. 5, assume that a second client 502 (e.g., fifa.com) desires access to the protected resource. At step (1), the client redirects the resource owner's (the user's) to the social networking site. At step (2), the social networking site performs an analysis on the redirect URL of the client and checks the policy, using the policy engine, as has been described. Based on this analysis, it is determined that automatic authorization for the second client is appropriate, e.g., because the second client is identified as being in the same category as was the first client and the request is of no greater scope than that to which consent was previously granted. Then, at step (3), the authorization server returns to the client a token. Typically, and as noted above, the token is returned to the client in an HTTP redirect. At step (4), the second client is returned to the resource server, presents the token, and then obtains access to the protected resource to complete the process.

As the example scenarios in FIG. 3 and FIG. 4 illustrate, when the policy engine approach of this disclosure is implemented, the resource owner need not be consulted to obtain explicit consent for the subsequent access request by the second client. This provides an intelligent "auto-consent" decision that provides significant advantages over the prior art wherein the resource owner is necessarily consulted each time consent is required.

Figure 6:
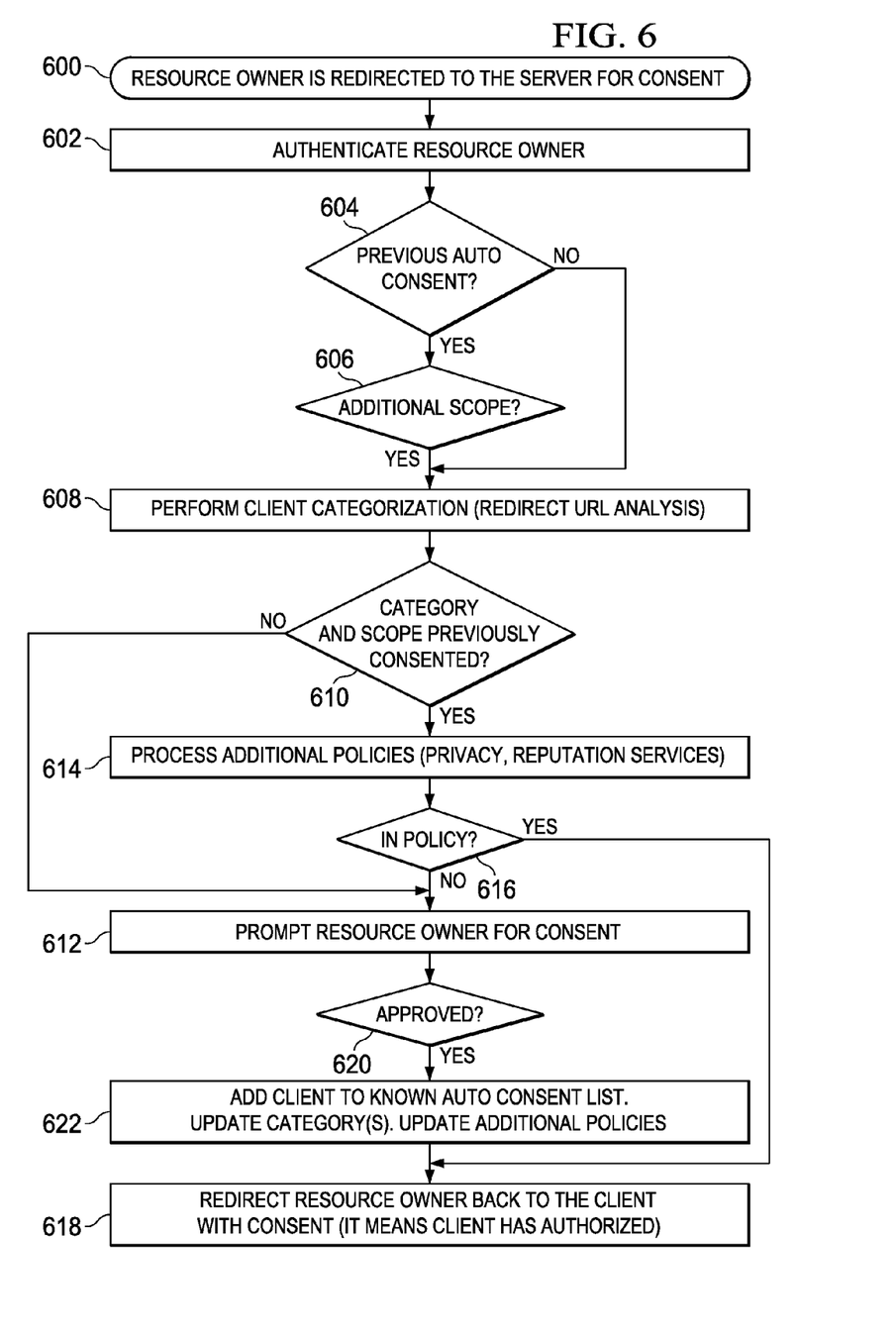
FIG. 6 illustrates a process flow of a representative embodiment.

FIG. 6 illustrates a process flow for the operation of the policy engine of this disclosure. This process flow corresponds generally to step (2) in FIG. 5. The routine typically begins at step 600 when the resource owner, having navigated to a client site, is redirected to the authorization server to evaluate the question of consent (i.e., whether the client site will be permitted access to some protected resource associated with the resource owner). The resource owner is authenticated at step 602. A test is then performed at step 604 to determine whether a previous automated consent has been issued. If a previous consent has been issued, the routine branches to step 606 to determine whether the scope of the consent being requested is of additional scope (as compared to a prior consent). If the outcome of the test at step 606 is positive, the routine continues at step 608. If the outcome of the test at step 606 is negative, access is permitted without more. Step 608 is also reached upon a negative determination from the test at step 604. At step 608, a client categorization is performed, typically by analyzing the redirect URL. The routine then continues at step 610 to determine whether, given the category as determined in step 608 and the scope of the request, whether consent for this category/scope has been previously granted. If not, the routine continues at step 612 to prompt the resource owner for consent. If automated consent for this category/scope has been issued by the server previously, however, the routine branches to step 614 to process one or more additional policies, such as privacy, reputation, or the like. Thus, at step 616, a test is performed to determine whether the category/scope is within a policy. If the outcome of the test at step 616 is negative, the routine returns to step 612 to prompt the resource owner for consent. If the outcome of the test at step 616 indicates that the category/scope is within the policy, the routine redirects the resource owner back to the client with consent, meaning that the client has authorization to access the protected resource. This is step 618, and it completes the process.

When it is necessary to prompt the resource owner for consent, a test is performed at step 620 to determine whether the resource owner has issued the consent. If so, the routine continues at step 622 to add the client to an "auto-consent" list. As required, at this time the routine also updates one or more categories and/or one or more policies to reflect the newly-issued consent by the resource owner. This update may be necessary because the consent is now authorized for what may be a new client type. Then, the routine then continues with step 618, as previously described.

As a skilled person will appreciate, an optimal resource owner experience for consent decisions is through the path 600, 602, 604, 608, 610, 614, 616 and 618.

The nature and type of "protected resource" may be varied and is not a limitation of this disclosure. Typically, a resource owner's protected resource includes such data as name, address, email alias, account number, demographic data, and the like.

The policy engine may be implemented as part of the authorization server or as an adjunct thereto.

The techniques herein are not limited to a particular type of client, such as a web site. The client may be implemented in other ways, such as in a device, like a suitably-provisioned mobile phone, tablet, television, intelligent vehicle, or other appliance.

As noted above, preferably the policy engine takes advantage of one or more client categorization sources or services to determine whether an automated consent may proceed. As noted above, in one embodiment the client categorization may be achieved based on redirect URI classification. The URI can be classified for example using a URL categorization database, by domain tagging, or the like. IBM X-Force provides a URL categorization database that may be queried. Open DNS domain tagging may be used to tag a site. In the above-described examples, the site espn.com and fifa.com may be tagged as "sports." During step (3) in FIG. 4, the applicable policy may then state that all sites with tag "sports" can access the protected resources (e.g., email address and name) from the social networking site. Because fifa.com also is tagged as a "sport" site, step (2) in FIG. 5 succeeds (the policy is validated) and fifa.com is permitted automatic access to the owner's email address and name. If, however, a third site that is not tagged as "sports" then tries to access those resources, the owner must first be prompted to authorize the site.

As also described, another information source or service may be a reputation service. Such a service may be query to determine whether a redirect URI is reputable and meets other criteria (for specific scopes). As is well-known, reputation service engines can be queried to vouch for the authenticity of a URI. Taking the above-described example scenarios, the authorization server may consider the redirect URI to be a URI and then use this URI to verify if the client is authentic. In particular, the redirect URI is checked with the reputation service engine, which may be a service provided by a third party. In the above example in FIG. 3, it is assumed that espn.com has an associated URI that is free of any malicious intent. During step (3), the policy can state that all websites that have a redirect URI free of any malicious intent can access the owner's protected resource(s) from the social networking site. Then, if fifa.com has a redirect URI that has no malicious intent, the site is permitted to access those resources, as has been described.

Another information source may be a privacy policy information service. In an alternative, the privacy policy may be associated with the authorization server itself. Known technical implementations of privacy policy services those based on P3P, ICRA, or the like. As in the examples for domain tagging and reputation, a policy may be implemented that states that all websites that share the same privacy policy can access the owner's private data. In an example scenario, a service such as the Google® Web-Safe browsing API may be used to determine whether a particular site (a redirect URI) is trusted enough to allow it access to private data.

As another information source, client relationship data may be obtained and examined to determine a relationship of a requesting client to other clients that have already been granted access to the protected resource(s). If a policy includes relationship data, it can be examined to determine whether automated consent should then be granted.

A particular policy may implement one or more of the above-described information sources.

Generalizing, the policy engine maintains information that associates a client, the client's categorization, the scope of a prior consent, any relationship data, and other data that may then be used to define one or more policies. Policies are generated, maintained, updated, and applied in the manner described to determine whether an automated consent may then be given to a new client requesting access to a protected resource.

Although the subject technique has been described by example in the context of the OAuth use case, this is not a limitation. The subject technique may be implemented in other use cases, such as F-SSO protocols that assert a user identity at a service provider. These F-SSO protocols include, for example, OpenID, SAML (Post/Artifact), or an OAuth-protected resource request.

Figure 7:
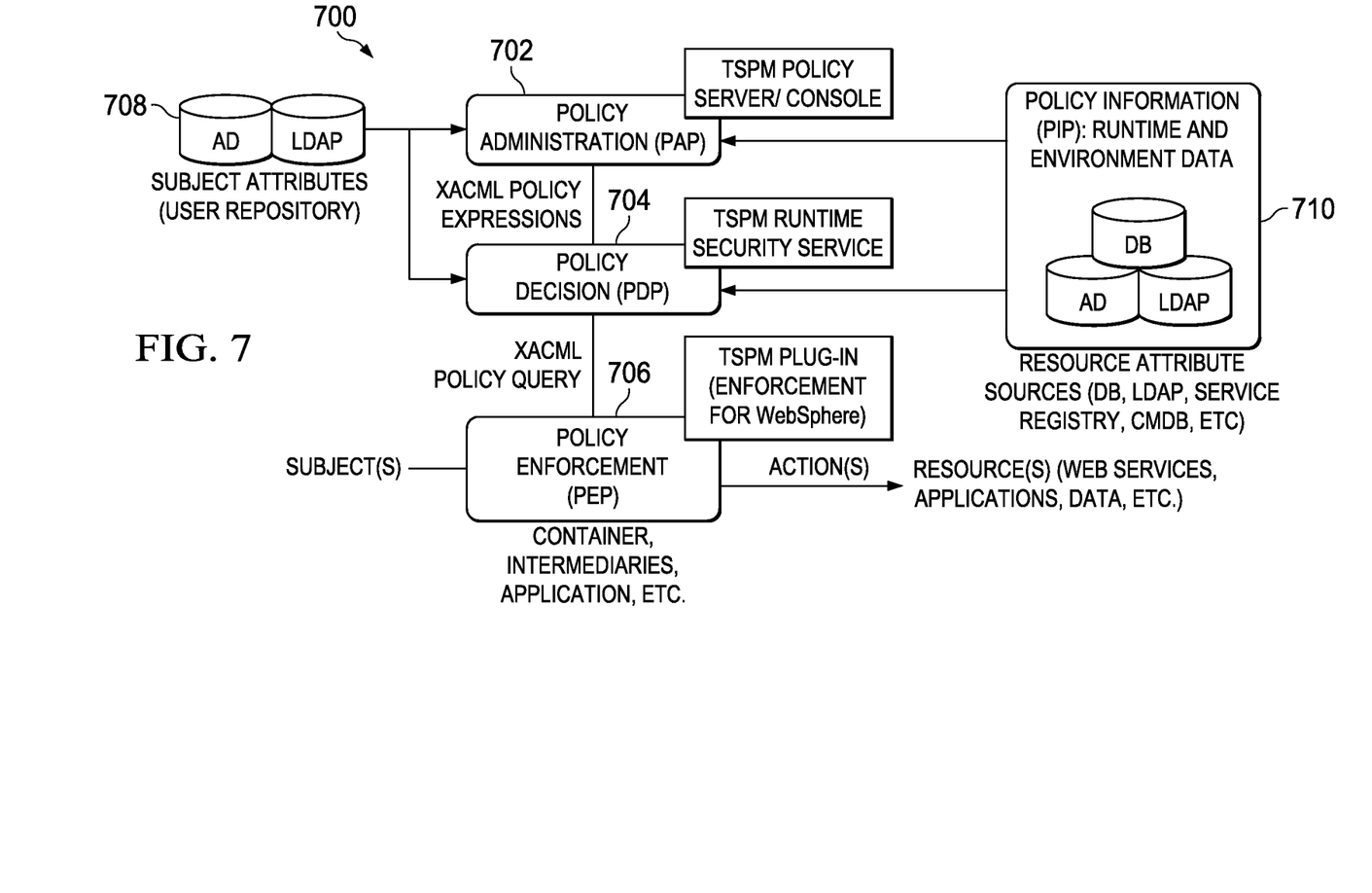
FIG. 7 illustrates a policy management system in which the policy engine of this disclosure may be implemented.

FIG. 7 illustrates a policy management system in which the anomaly workflow of this disclosure may be implemented. The system 700 may be implemented across one or more machines operating in a computing environment, such as shown in FIG. 1. Typically, the system comprises a policy administration point (PAP) 702, a policy decision point (PDP) 704, and a policy enforcement point (PEP) 706. Generally, the policy administration point 702 is used to define a consent policy, which may be specified as a set of XACML policy expressions. This policy uses subject attributes provided from a user repository 708, as well runtime and environment data received from policy information point (PIP) 710. The policy decision point (PDP) 704 receives similar information and responds to an XACML policy query received from the policy enforcement point (PEP) 606 to enforce the policy on a subject and with respect to a particular action initiated by the subject. PEP 706 implements the desired consent workflow. In one commercial implementation of this approach, the PAP 702 is implemented by IBM Tivoli® Security Policy Manager (TSPM) policy service or console, the PDP 704 is implemented in the TSPM runtime security service, and the PEP is implemented as a TSPM plug-in to IBM WebSphere® Application Server.

The disclosed technique provides several advantages. By using this technique, the resource owner does not need to intervene during the authorization step for each client. The system is "intelligent" in that it categorizes clients and gives authorization to clients based on a category to which they belong. To facilitate this process, the resource owner's authorization decisions are fed into an engine that determines whether additional authorization is required by the resource owner. The approach facilitates the provision of a managed consent function/service that is reliable, available and scalable.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the F-SSO functions may be hosted within or external to the cloud.

Still more generally, the subject matter described herein can take the form of an entirely hardware embodiment, an entirely software embodiment or an embodiment containing both hardware and software elements. In a preferred embodiment, the anomaly detection function is implemented in software, which includes but is not limited to firmware, resident software, microcode, and the like. The data retrieved by the detection device can be configured into a data structure (e.g., an array, a linked list, etc.) and stored in a data store, such as computer memory. Furthermore, as noted above, the enhanced F-SSO functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the proxy and F-SSO components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

As noted, the policy engine functions may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described our invention, what we now claim is as follows:

1. A method of managing grant of consent to access a protected resource, the protected resource associated with a resource owner, comprising:
  upon receipt of a request to access a protected resource, the request having a scope and being associated with a second web client, performing an analysis based on a universal resource identifier (URI) associated with the request to identify a characteristic of the second web client, the analysis being performed using a computing entity having a hardware element;
  based on the characteristic of the second web client and the scope of the request, applying a policy to determine whether the second web client is entitled to receive an automated consent to access the protected resource as a result of a consent having been previously granted by the resource owner to a first web client; and
  when, based on the policy the second web client is entitled to receive the automated consent, returning given information useful by the second web client to obtain access to the protected resource without requiring an explicit consent from the resource owner;
  when the second web client is not entitled to receive the automated consent to access the protected resource issuing a prompt to the resource owner to obtain explicit consent.

2. The method as described in claim 1 wherein the characteristic of the second web client is one of: a client category, a domain tag, an indication that the request has originated from a reputable source, and an indication that the second web client has a given privacy policy.

3. The method as described in claim 1 further including:
  obtaining a response to the prompt;
  upon receipt of a response to the prompt, updating the policy to include a category associated with the second web client.

4. The method as described in claim 3 further including updating a consent list to include the second web client.

5. The method as described in claim 1 wherein the given information is an OAuth token.

6. Apparatus, comprising:
  a processor;
  computer memory holding computer program instructions executed by the processor to manage grant of consent to access a protected resource, the protected resource associated with a resource owner, the method comprising:
    upon receipt of a request to access a protected resource, the request having a scope and being associated with a second web client, performing an analysis based on a universal resource identifier (URI) associated with the request to identify a characteristic of the second web client;
    based on the characteristic of the second web client and the scope of the request, applying a policy to determine whether the second web client is entitled to receive an automated consent to access the protected as a result of a consent having been previously granted by the resource owner to a first web client; and
    when, based on the policy the second web client is entitled to receive the automated consent, returning given information useful by the second web client to obtain access to the protected resource without requiring an explicit consent from the resource owner;
    when the second web client is not entitled to receive the automated consent to access the protected resource, issuing a prompt to the resource owner to obtain explicit consent.

7. The apparatus as described in claim 6 wherein the characteristic of the client is one of: a client category, a domain tag, an indication that the request has originated from a reputable source, and an indication that the second web client has a given privacy policy.

8. The apparatus as described in claim 6 wherein the method further includes:
  obtaining a response to the prompt;
  upon receipt of a response to the prompt, updating the policy to include a category associated with the second web client.

9. The apparatus as described in claim 8 wherein the method further includes updating a consent list to include the second web client.

10. The apparatus as described in claim 6 wherein the given information is an OAuth token.

11. A computer program product in a non-transitory computer readable medium for use in a data processing system, the computer program product holding computer program instructions which, when executed by the data processing system, perform a method of managing grant of consent to access a protected resource, the protected resource associated with a resource owner, the method comprising:
  upon receipt of a request to access a protected resource, the request having a scope and being associated with a second web client, performing an analysis based on a universal resource identifier (URI) associated with the request to identify a characteristic of the second web client;
  based on the characteristic of the second web client and the scope of the request, applying a policy to determine whether the second web client is entitled to receive an automated consent to access the protected resource as a result of a consent having been previously granted by the resource owner to a first web client; and
  when, based on the policy the client is entitled to receive the automated consent, returning given information useful by the second web client to obtain access to the protected resource without requiring an explicit consent from the resource owner;
  when the second web client is not entitled to receive the automated consent to access the protected resource, issuing a prompt to the resource owner to obtain explicit consent.

12. The computer program product as described in claim 11 wherein the characteristic of the client is one of: a client category, a domain tag, an indication that the request has originated from a reputable source, and an indication that the second web client has a given privacy policy.

13. The computer program product as described in claim 11 wherein the method further includes:
  obtaining a response to the prompt;
  upon receipt of a response to the prompt, updating the policy to include a category associated with the second web client.

14. The computer program product as described in claim 13 wherein the method further includes updating a consent list to include the second web client.

* * * * *